United States Patent
Michaelis

(10) Patent No.: US 9,143,602 B2
(45) Date of Patent: Sep. 22, 2015

(54) METHODS AND SYSTEMS TO ENSURE THAT THE USER OF A TOUCH OR KEYPAD OPERATED DEVICE WITHIN A MOVING VEHICLE MUST USE TWO HANDS FOR DEVICE OPERATION

(71) Applicant: Avaya Inc., Basking Ridge, NJ (US)

(72) Inventor: Paul Roller Michaelis, Louisville, CO (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 14/091,143

(22) Filed: Nov. 26, 2013

(65) Prior Publication Data

US 2015/0148019 A1    May 28, 2015

(51) Int. Cl.
*H04M 3/00* (2006.01)
*H04M 1/725* (2006.01)
*H04W 4/12* (2009.01)
*H04W 4/02* (2009.01)

(52) U.S. Cl.
CPC .......... *H04M 1/72563* (2013.01); *H04W 4/027* (2013.01); *H04W 4/12* (2013.01)

(58) Field of Classification Search
CPC . H04W 8/245; H04M 1/72519; H04M 1/609; B60Q 1/54
USPC ...................... 455/418, 550.1, 569.2; 340/441
See application file for complete search history.

(56) References Cited

U.S. PATENT DOCUMENTS

| | | | |
|---|---|---|---|
| 8,417,268 B1 | 4/2013 | Halferty et al. | |
| 2005/0253806 A1* | 11/2005 | Liberty et al. | 345/156 |
| 2010/0216509 A1* | 8/2010 | Riemer et al. | 455/557 |
| 2011/0074828 A1* | 3/2011 | Capela et al. | 345/661 |
| 2011/0077032 A1 | 3/2011 | Correale et al. | |
| 2011/0185316 A1* | 7/2011 | Reid et al. | 715/863 |
| 2012/0044156 A1 | 2/2012 | Michaelis | |
| 2013/0150004 A1* | 6/2013 | Rosen | 455/414.1 |
| 2013/0303143 A1 | 11/2013 | Schrader et al. | |

FOREIGN PATENT DOCUMENTS

| WO | WO 2010/062754 | 6/2010 |
|---|---|---|
| WO | WO 2012/142200 | 10/2012 |

OTHER PUBLICATIONS

"Texting While Driving", Cellcontrol, 2013 [retrieved on Nov. 27, 2013], 2 pages. Retrieved from: www.cellcontrol.com/.
Rubenking, Neil J., "CellSafety 2.0 Preview" PCMag.com, May 2, 2011 [retrieved on Nov. 27, 2013], 4 pages. Retrieved from: www.pcmag.com/article2/0,2817,2384644,00.asp.

(Continued)

*Primary Examiner* — Danh Le
(74) *Attorney, Agent, or Firm* — Sheridan Ross P.C.

(57) ABSTRACT

Systems and methods are directed to configuring a portable electronic device such that a user of the portable electronic device is required to use two hands to operate the portable electronic device. In some configurations, the portable electronic device determines whether the portable electronic device is moving at a rate of speed that is greater than a predetermined threshold before requiring the user to use two hands. Alternatively, or in addition, a function, feature, and/or application of the portable electronic device may be inhibited such that two hands are required. Once the portable electronic device determines that the user is using two hands, an operation, feature, function, and/or application may then be enabled although still be inhibited.

20 Claims, 13 Drawing Sheets

(56) References Cited

OTHER PUBLICATIONS

"DriveSafe.ly", iSpeech, no date [retrieved on Nov. 27, 2013], 2 pages. Retrieved from: www.drivesafe.ly/.
"iZup", uknowkids.com, 2013 [retrieved on Nov. 27, 2013], 2 pages. Retrieved from: info.uknowkids.com/blog/bid/159144/iZup-App-Prevents-Texting-While-Driving-to-keep-kids-safe.
"Key2SafeDriving", Key2SafeDriving, 2013 [retrieved on Nov. 27, 2013], 2 pages. Retrieved from: key2safedriving.com/.
"Otter", Otter LLC, 2010, [retrieved on Nov. 27, 2013], 1 page. Retrieved from: www.otterapp.com/.
"Sprint Drive First", Sprint 2013, [retrieved on Nov. 27, 2013], 2 pages. Retrieved from: drivefirst.sprint.com/welcome.htm.
"Stop Txting", StopTxting.com 2013 [retrieved on Nov. 27, 2013], 1 page. Retrieved from: www.stoptexting.com/.
"Textecution kills texting functions while driving so your child, loved one, or employee lives.", Jonathan Young Enterprises, LLC and eLYK innovation, Inc. Partnership, 2013, [retrieved on Nov. 27, 2013], 1 page. Retrieved from: www.textecution.com/.
"DriveSmart.app", T-Mobile, 2013 [retrieved on Nov. 27, 2013], 2 pages. Retrieved from: support.t-mobile.com/docs/DOC-2374.
"Txtblocker", tXtBlocker, no date [retrieved on Nov. 27, 2013], 1 page. Retrieved from: txtblocker.com/.
"Distracted Driving", Vlingo 2010 [retrieved on Nov. 27, 2013], 2 pages. Retreived from www.vlingo.com/.
Extended Search Report for European Patent Application No. 14194987.5, dated Apr. 1, 2015 7 pages.

* cited by examiner

| User | Two-Hand Mode | |
|---|---|---|
| User 1 | Two-Hand Operation Always Required When Moving | |
| User 2 | According to Applicable Laws of Current Location (On) | |
| | Speed > 5 mph | |
| | Cadence Detection (On) | |
| | Functions/Features/Applications | |
| | Keyboard | Two-Hand Operation Not Required |
| | Text Messaging | Two-Hand Operation Required |
| | Web Browsing | Two-Hand Operation Required |
| | E-mail | Two-Hand Operation Required |
| | Angry Birds | Two-Hand Operation Required |
| | Data Communication | Two-Hand Operation Not Required |
| User 3 | According to Applicable Laws of Current Location (Off) | |
| | Speed > 0 mph | |
| | Cadence Detection (Off) | |
| | Functions/Features/Applications | |
| | Keyboard | Two-Hand Operation Required |
| | Text Messaging | Two-Hand Operation Required |
| | Web Browsing | Two-Hand Operation Required |
| | E-mail | Two-Hand Operation Required |
| | Angry Birds | Two-Hand Operation Required |
| | Data Communication | Two-Hand Operation Required |
| | Overide | Voice-to-Text, Bluetooth® |

Figure 8

METHODS AND SYSTEMS TO ENSURE THAT THE USER OF A TOUCH OR KEYPAD OPERATED DEVICE WITHIN A MOVING VEHICLE MUST USE TWO HANDS FOR DEVICE OPERATION

FIELD OF THE DISCLOSURE

An exemplary embodiment is generally directed toward requiring that a portable electronic device be used with two hands when the portable electronic device is moving at a rate that is greater than a predetermined threshold.

BACKGROUND

It is well known that motor vehicle operators, who send text messages while driving, are more likely to have accidents. According to a recent article entitled "1 in 4 surf Web while behind wheel" (hereinafter "the Article"), the National Highway Traffic Safety Administration reported that texting while driving creates a crash risk that is twenty-three times greater than not doing so. (Copeland, Larry. "1 in 4 surf Web while behind wheel." USA Today. 12 Nov. 2013. Web. 12 Nov. 2013", the entire content of which is hereby incorporated by reference, in its entirety, for all that it teaches and for all purposes). Moreover, according to the Article, the rise in ownership of smartphones means there are more opportunities than ever for a driver to be distracted. For example, according to one survey, nearly one out of four drivers is going online while driving. Although texting and accessing the Internet while driving is clearly an unsafe practice, and illegal in several jurisdictions, many people continue to do so.

There are any number of ways to disable and/or alter a device's operability automatically if the device is within a moving vehicle. For example, the texting function may be disabled automatically if GPS or cell tower triangulation indicate that the device is moving at a fast rate. As another example, the operability of the device as a whole may be modified such that the device is rendered inoperable if the device is moving at a fast rate. However, disabling texting and/or Internet access for all occupants of a moving vehicle, and not just for the driver, is a poor solution.

SUMMARY

One category of previous solutions is based on movement related lock-out. One disadvantage of this method is that all devices with a movement-dependent application are locked out regardless of whether the device user is the operator of the vehicle or a passenger. Another category is device inhibiting applications. Some of the disadvantages of these include: no differentiation between the vehicle operator and passenger; that is the device inhibiting applications inhibit all devices without regard to whether you may be a passenger or a driver; lock-out of use for emergencies; no differentiation between hands-free phone usage and texting use; and conversion of text to speech which encourages a response. The last category of applications may be directed to those applications that autoreply and/or redirect a messaging type. Some of the disadvantages of these applications is that these applications are applied without differentiation between the vehicle operator and a passenger. None of the previous solutions allow passengers device usage for texting while blocking texting for the operator of the vehicle. Under the assumption that the driver of a moving vehicle (unlike the passengers) must have at least one hand on the steering wheel, embodiments of the present disclosure seek to provide an improved solution by requiring two hands for operating a portable electronic device if the portable electronic device is in a moving vehicle or assumed to be within a moving vehicle.

In accordance with at least one embodiment of the present disclosure, systems and methods are presented which are directed to inhibiting a portable electronic device when the portable electronic device is moving such that two-handed operation is required. Accordingly, when the user is also the vehicle operator, attempts to operate the portable electronic device in a two-handed operational mode may be impractical. The portable electronic device may be a mobile phone, a smartphone or the like.

In at least one embodiment, the portable electronic device may inhibit the operability, such as one or more operations, of the portable electronic device while movement of the portable electronic device is detected, unless a screen, such as a touchscreen, of the portable electronic device confirms that it is being touched by at least one finger from each hand within a certain time-constrained period. Movement may be detected by one of several methods such as GPS, cell tower registration, triangulation or the like. Moreover, it has been observed that most people who operate a portable electronic device while they are driving use one hand to hold the device and enter characters and the remaining hand to control the vehicle direction. By requiring a detection of at least one finger, or a portion of a finger, from each hand in order to perform one or more specific operations while the portable electronic device is within a vehicle that is moving, the passengers may easily operate their portable electronic device while making it impractical for the driver to operate their portable electronic device message. The combination of vehicle motion and two-handed usage helps solve several of the problems associated with prior methods.

In at least one embodiment, the portable electronic device would disallow texting while movement is detected unless the screen could confirm that it was being touched by at least one finger from each hand over a certain time-constrained period. Movement would be detected by one of several methods such as GPS, cell tower registration, triangulation or the like. It has been observed that most people who text while they are driving use one hand to hold the device and enter characters and the remaining hand to control the vehicle direction. By requiring a detection of at least one finger, or a portion of a finger, from each hand to text while the portable electronic device is moving, passengers may easily text message while making it impractical (although not impossible) for the driver to text message. The combination of vehicle motion and two-handed usage helps solve several of the problems associated with prior methods.

In accordance with at least one embodiment, fingerprint portions for multiple users may be stored for situations where a portable electronic device is shared. For example, a child and a parent may share the same portable electronic device. Based on a fingerprint and/or a portion of a fingerprint, the user of the portable electronic device may be identified and the user identity may be utilized for the purpose of differing parental controls of multiple children and/or users using the portable electronic device.

In accordance with at least one embodiment, a cadence associated with a fingerprint portion keystroke may be considered in order to deal with the issue of a driver trying to do two-handed texting and/or device operation while driving. For example, while a driver may attempt to do two handed texting, Internet browsing, and/or operate the portable electronic device in some other manner, the driver will usually break their cadence when looking up for vehicle control purposes while driving. For instance, a driver attempting to enter text with two hands using a keypad or touch screen of a portable electronic device may be likely to enter a small cluster of characters, pause to look at the road, enter a small cluster of characters, pause again, and so on. In other words, the text entry by the driver may be much more "bursty" than that of text entered by a passenger. Accordingly, this "burstyness" may be detected and utilized to modify the operability of the portable electronic device. For example, the rate of character entry and/or the pauses may be compared to one or more patterns indicative of a distracted user, or a user that is not fully concentrating on operating the portable electronic device. For example, a pattern indicative of a user who is not fully concentrating on operating the portable electronic device may include "bursty" instances of character/keystroke entry with pauses in-between. Accordingly, a user entering characters/keystrokes in this manner may match this pattern. Thus, if the portable electronic device determines that the user is distracted or not fully concentrating on operating the portable electronic device, the touch screen and/or the application in which the driver was using may be disabled for a certain amount of time until the user completes one or more tasks and/or a series of steps that sufficiently indicates that the user is not driving. For instance, the user may have to enter a series of displayed characters within a certain amount of time. If the user completes the task, the operability of the portable electronic device may then modified such that the previously disabled application is enabled.

In accordance with at least one embodiment of the present disclosure, a touch screen may be utilized to detect contact from finger portions used for holding the portable electronic device that do not overlap the QWERTY keyboard appearance on the touch screen. This would allow detection of a first hand holding the portable electronic device while a second hand may be used for entering text characters and other portable electronic device related input. Since this method confirms two-handed operation, it is impractical (although not impossible) for the driver to send text messages, browse the Internet, and/or operate the portable electronic device in some other manner. In addition, such an embodiment may be more computationally efficient since it does not have to detect fingerprint portions, but rather just the presence of fingers holding the device and a second hand entering one or more keystrokes.

In accordance with at least one embodiment of the present disclosure, a touch screen may detect the topology of fingers contacting the touchscreen to confirm two-handed operation, such as two-handed texting and two-handed internet browsing. For example, each finger has a known aspect ratio compared with other fingers. As a result it is possible to detect fingers from one hand wrapping around the edge of the portable electronic device while a second hand may be used to actuate text keystrokes or interface with the portable electronic device.

In accordance with at least one embodiment of the present disclosure, a hard key on a smart phone may be required to be held down while performing another device operation, such as text messaging, Internet browsing and the like, again with the intent of confirming two-handed device operation. For example, a hard key at the bottom of a phone may have one meaning when touched a single time and another meaning when touched twice. Accordingly, this embodiment may require holding this hard key down as a method of utilizing one hand and the entry of characters to indicate usage by a second hand.

In accordance with at least one embodiment of the present disclosure, two or more keys located near the periphery of the portable electronic device may be held down while gripping the portable electronic device in one hand, while keystrokes or other input are entered with a second hand. Depending on the keys available for such a purpose, this system and method may extend embodiments of the current disclosure to those portable electronic devices lacking a touch screen.

In accordance with at least one embodiment of the present disclosure, a detected device location may be compared to an index of illegal device usage by location/jurisdiction. If the user attempts to use a device in an illegal mode (e.g., voice, text, etc.) while moving such mode in inhibited while in that location/jurisdiction.

In accordance with at least one embodiment of the present disclosure, a method is presented, the method comprising determining whether a portable electronic device is moving at a rate greater than a predetermined threshold, in response to determining that the portable electronic device is moving at a rate greater than the predetermined threshold, disabling a first operation of the portable electronic device, receiving an indication of two-handed operation being used to operate the portable electronic device, and while the portable electronic device is moving at a rate greater than the predetermined threshold and in response to receiving the indication two-handed operation being used to operate the portable electronic device, enabling the first operation of the portable electronic device.

In accordance with at least one embodiment of the present disclosure, a system for controlling at least one of a feature and a function of a portable electronic device while the portable electronic device is moving at a rate greater than a predetermined threshold is presented, the system comprising the portable electronic device, a movement analyzer configured to determine whether the portable electronic device is moving at a rate greater than the predetermined threshold, a hand portion detector configured to determine whether two-handed operation is being used during the operation of the portable electronic device, and a controller configured to enable and disable an operation of the portable electronic device, while the portable electronic device is moving at a rate greater than the predetermined threshold, based on whether the hand portion detector determines whether two-handed operation is being used during the operation of the portable electronic device.

In accordance with at least one embodiment of the present disclosure, a system for controlling at least one of a feature and a function of a portable electronic device while the portable electronic device is moving at a rate greater than a predetermined threshold is presented, the system comprising the portable electronic device, a protective shell configured to receive the portable electronic device, wherein the protective shell is communicatively coupled to the portable electronic device, a movement analyzer configured to determine whether the portable electronic device is moving at a rate greater than the predetermined threshold, a hand detector configured to determine whether two-handed operation is being used during the operation of the portable electronic device by determining whether at least one hand portion from each of the two hands is in contact with a sensor located on the protective shell, and a controller configured to enable and disable an operation of the portable electronic device, while the portable electronic device is moving at a rate greater than the predetermined threshold, based on whether the hand detector determines whether two-handed operation is being used during the operation of the portable electronic device. In one embodiment, the protective shell further comprises a battery such that the removal of the protective shell disables the portable electronic device.

In yet another embodiment, a method is presented, the method comprising determining that a portable electronic device is moving at a rate greater than a predetermined threshold, and in response to determining that the portable electronic device is moving at a rate greater than the predetermined threshold, inhibiting an operability of the portable electronic device such that the portable electronic device requires that two hands be used to operate the portable electronic device.

In yet another embodiment, a method is presented, the method comprising determining that a portable electronic device is moving at a rate greater than a predetermined threshold, and in response to determining that the portable electronic device is moving at a rate greater than the predetermined threshold, inhibiting an operability of one or more of a display, touchscreen, and keypad of the portable electronic device such that the portable electronic device requires two hands be used to operate the one or more of a display, touchscreen, and keypad of the portable electronic device.

Other related embodiments are possible without departing from the intent of this invention.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "user" as used herein may refer to any individual, operator, or person that operates a portable electronic device. For example, the user may refer to a passenger in a vehicle operating a portable electronic device. Alternatively, or in addition, the user may refer to a vehicle operator and/or driver in a vehicle operating a portable electronic device.

The term "rate' as used herein may refer to a ratio between two measurements with different units. For example, a rate may generally refer to a change in one measurement with respect to another measurement. As one example, a rate of speed may refer to a distance traveled with respect to a certain amount of time. Additionally, other non-limiting measurements of rate may be associated with rotation, acceleration, velocity, distance, and/or time.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

Exemplary embodiments of the present disclosure are described in conjunction with the appended figures where:

FIG. 8 depicts one or more user profiles in accordance with an embodiment of the present disclosure;

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Furthermore, while embodiments of the present disclosure will be described in connection with automobile examples, it should be appreciated that embodiments of the present disclosure are not so limited. In particular, embodiments of the present disclosure can be applied to any vehicle in which an operator may use a portable electronic device and become distracted while operating the vehicle. For instance, any scenario involving or requiring that the operator of a vehicle, such as a driver, pilot, captain, engineer, or the like, maintain concentration and focus to successfully and safely operate a vehicle for a particular mode of transportation may on the successful operation of the vehicle may utilize one or more embodiments described herein. The usage of automobile examples is for illustrative purposes only and should not be construed as limiting the claims.

Figure 1:
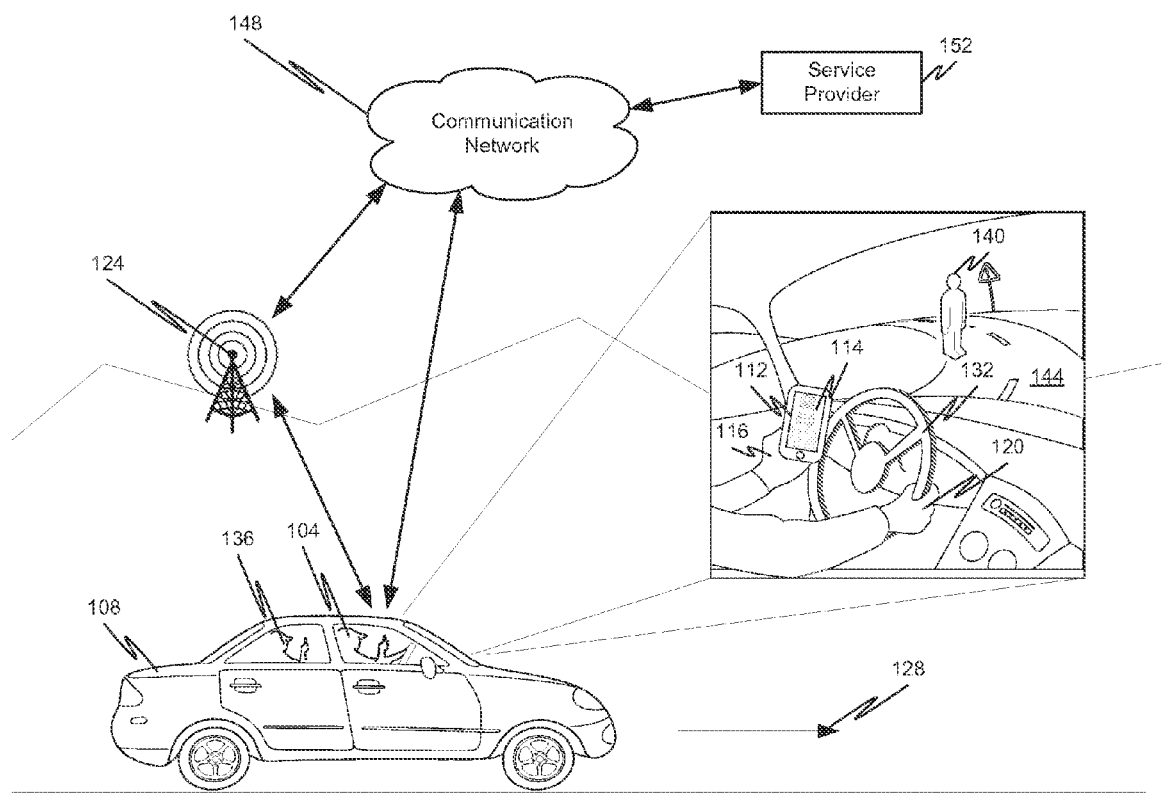
FIG. 1 is a diagram illustrating one or more hazardous situations to be prevented in accordance with at least one embodiment of the present disclosure.

FIG. 1 depicts an illustrative embodiment of a typical scenario in which a driver 104 operating an automobile 108 driving at a rate of speed 128 may become distracted. That is, while the driver 104 is driving the automobile 108, the driver 104 may operate a portable electronic device 112. For example, the driver 104 may utilize the portable electronic device 112 to browse the Internet, text message another party, check and/or respond to email, view directions, operate a global positioning system (GPS) device, play a game, interact with an application (app), make a phone call, and/or interact in one manner or another with the portable electronic device 112. In particular, the driver 104 may utilize one or more of a keypad and a touchscreen of the portable electronic device 112, often requiring the driver 104 to look at the portable electronic device 112 for operation. Often, the driver 104 will hold the portable electronic device 112 in one hand, such as left hand 116, while keeping the other hand, such as the right hand 120, on a steering wheel 132 to steer the automobile 108. As the driver 104 looks at or otherwise interacts with the portable electronic device 112, the driver 104 may become distracted such that the driver 104 operates the automobile 108, in an unsafe manner. As one example, the Article indicated that a recent study suggests that on average a driver reading or sending a text message may take their eyes off the road for an average of 4.6 seconds—covering roughly one hundred yards at a speed of fifty-five miles an hour. Thus, the driver 104 may not see or be able to react to a potentially dangerous situation, such as a pedestrian 140 crossing the road 144. Accordingly, any amount of time in which the attention of the driver 104 is diverted from, or otherwise not focused on, driving the automobile 108 may have disastrous consequences.

In accordance with at least some embodiments of the present disclosure, a portable electronic device 112 may comprise any type of known communication equipment or collection of communication equipment. Examples of a suitable portable electronic device 112, may include, but are not limited to, a personal computer or laptop, a cellular phone, a smartphone, a tablet, an iPod, a smart watch, or other device which can make or receive communications. In some embodiments, the portable electronic device 112 may have a display 114 and/or keypad in which the operator of the portable electronic device 112, such as the driver 104 and/or a passenger 136, may interact with the portable electronic device 112. In general, the portable electronic device 112 may operable to provide many capabilities to the user, such as the driver 104 and/or the passenger 136. These capabilities, or operations, may include but are not limited to, video, audio, text, applications, and/or data communications. Each operation, or capability, may correspond to one or more functions, features, and/or applications of the portable electronic device 112. For example, the portable electronic device 112 may operate in a manner such that a user, such as driver 104, has the ability to browse the Internet; thus, the portable electronic device 112 may utilize one or more applications, such as a web browser, to provide the feature of browsing the Internet. As another example, the portable electronic device 112 may operate in a manner such that the portable electronic device 112 provides one or more notifications to a user, such as driver 104, in accordance with a satisfaction of one or more criteria and/or event. For instance, the portable electronic device 112 may notify the user, such as driver 104 and/or passenger 136, that the user has a new email, has received a text message from another party, that a meeting will be starting in fifteen minutes, and/or that it is a certain time, such as 3:30 PM. Accordingly, the portable electronic device 112 may operate to provide a notification feature. Such a feature may be available within an application and/or may be provided as a function of the portable electronic device 112.

The portable electronic device 112 may communicate with other portable electronic devices and/or send and receive data utilizing a communication network 148. The communication network 148 may be packet-switched and/or circuit-switched. An illustrative communication network 148 includes, without limitation, one or more of a Wide Area Network (WAN), such as the Internet, a Local Area Network (LAN), a Personal Area Network (PAN), a Public Switched Telephone Network (PSTN), a Plain Old Telephone Service (POTS) network, a cellular communications network, an IP Multimedia Subsystem (IMS) network, a Voice over IP (VoIP) network, a SIP network, or the like, and combinations thereof. The Internet is an example of the communication network 148 that constitutes an Internet Protocol (IP) network including many computers, computing networks, and other communication devices located all over the world. In one configuration, the communication network 148 is a public network supporting the TCP/IP suite of protocols. Communications supported by the communication network 148 include real-time, near-real-time, and non-real-time communications. For instance, the communication network 148 may support voice, video, text, web-conferencing, or any combination of media. Moreover, although the personal electronic device 112 may primarily utilize wireless forms of communication, the communication network 148 may comprise a number of different communication media such as coaxial cable, copper cable/wire, fiber-optic cable, antennas for transmitting/receiving wireless messages, and combinations thereof. In addition, it can be appreciated that the communication network 148 need not be limited to any one network type, and instead may be comprised of a number of different networks and/or network types.

For illustrative purposes, a driver 104 may wish to send a text message to another party and/or browse the Internet to locate an address of a favorite restaurant. The driver, who should have pulled to the side of the road 144, may use the portable electronic device 112 to send the text message and retrieve Internet data via the communication network 148. The wireless connection and/or cellular tower 124 may be operable to carry and handover telephony and/or data traffic for the portable electronic device 112, within a specified range, for communication with other portable electronic devices. As another example, a PAN may be established between a portable electronic device 112 belonging to the driver and a portable electronic device 112 belonging to the passenger 136. The driver, who should have pulled to the side of the road 144, may use the portable electronic device 112 to send and receive information utilizing the communication network 148, where the communication network 148 is the PAN. Although embodiments of the present disclosure will refer to one communication network 148, it should be appreciated that the embodiments claimed herein are not so limited. For instance, multiple communication networks 148 may be utilized for communication purposes.

Figure 2:
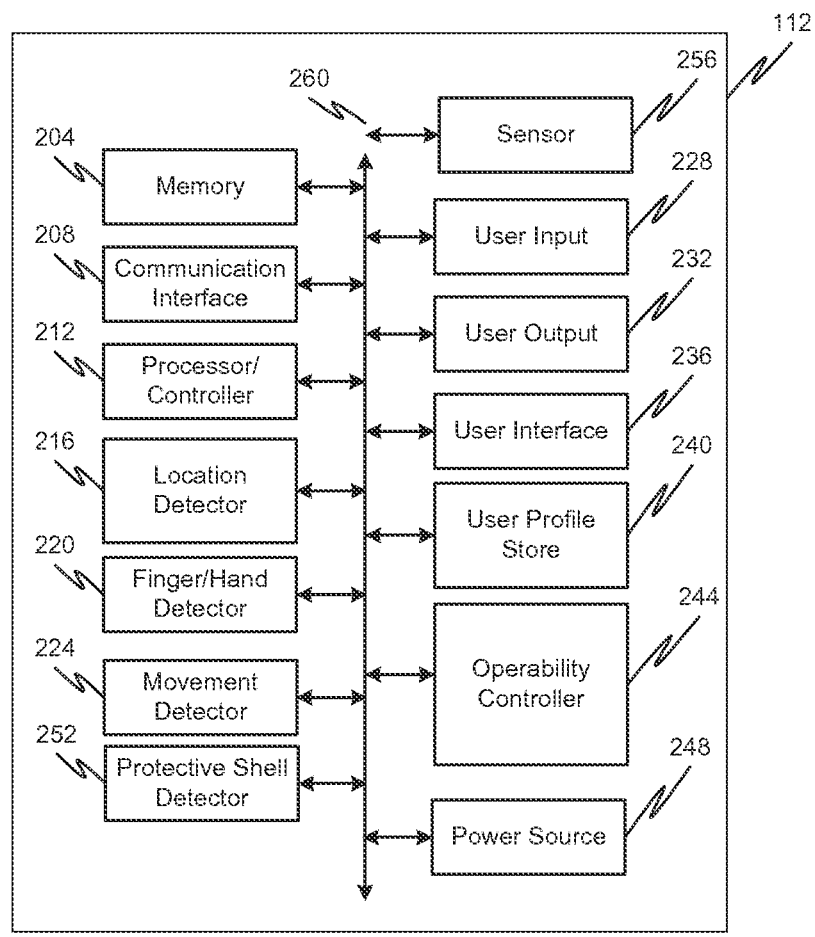
FIG. 2 is a block diagram of a portable electronic device in accordance with an embodiment of the present disclosure.

FIG. 2 illustrates a block diagram depicting one or more components of a portable electronic device 112. The portable electronic device 112 may include a memory 204, communication interface 208, processor/controller 212, location detector 216, finger/hand detector 220, movement detector 224, user input 228, user output 232, user interface 236, user profile store 240, operability controller 244, power source 248, a protective shell detector 252, a sensor 256, and one or more busses 260. However, in other embodiments, the portable electronic device 112 includes only some of the components 204-260. For example, in one embodiment, the portable electronic device 112 includes memory 204, processor/controller 212, finger/hand detector 220, movement detector 224, user input 228, user output 232, user interface 236, operability controller 244, one or more busses 260, and the power source 248, but does not include the communication interface 208, location detector 216, user profile store 240, protective shell detector 252, or the sensor 256. In another embodiment, the portable electronic device 112 includes the memory 204, communication interface 208, processor/controller 212, finger/hand detector 220, movement detector 224, user input 228, user output 232, user interface 236, user profile store 240, operability controller 244, one or more busses 260, sensor 256, and power source 248, but does not include the location detector 216 or the protective shell detector 252. In general, the portable electronic device 112 may include any suitable combination of the components 204-260.

The processor/controller 212 may be capable of executing program instructions. The processor/controller 212 may include any general-purpose programmable processor or controller for executing application programming. Alternatively, or in addition, the processor/controller 212 may comprise an application specific integrated circuit (ASIC). The processor/controller 212 generally functions to execute programming code that implements various functions performed by the portable electronic device 112 in accordance with at least some embodiments of the present disclosure.

The portable electronic device 112 may additionally include memory 204. The memory 204 may be used in connection with the execution of programming instructions by the processor/controller 212, and for the temporary or long-term storage of data and/or program instructions. For example, the processor/controller 212, in conjunction with the memory 204 of the portable electronic device 112, may operate to disable an operation (one or more features, functions, and/or applications) or otherwise modify/inhibit the operability of the portable electronic device 112 in accordance with embodiments of the present disclosure.

The memory 204 of the portable electronic device 112 may comprise solid-state memory that is resident, removable and/or remote in nature, such as DRAM and SDRAM. Moreover, the memory 204 may comprise a plurality of discrete components of different types and/or a plurality of logical partitions. In accordance with still other embodiments, the memory 204 comprises a non-transitory computer readable storage medium. Such a medium may take many forms, including but not limited to, non-volatile media, volatile media, and transmission media.

The portable electronic device 112 may include a user interface 236 allowing a user, such as a driver 104 and/or a passenger 136, to interact with the portable electronic device 112, to operate the portable electronic device 112, and/or to interact with a feature, function, and/or application of the portable electronic device 112. For example, a user of the portable electronic device 112 may be able to access directions, text message another party, browse the Internet, and/or initiate a communication with another user and/or entity. Moreover, the user may interact with the user interface 236 to configure one or more parameters of the portable electronic device 112, operate or otherwise interact with one or more applications running on the portable electronic device 112, and configure one or more user profiles 800, as described with respect to FIG. 8. Examples of user input devices 228 include a keypad, a touch screen 114, a microphone, and a pointing device. Examples of user output device 232 include a display 114 which may be a touch screen display, a speaker, and one or more haptic output devices.

The portable electronic device 112 may be equipped with a communication interface 208. The communication interface 208 may comprise a GSM, CDMA, FDMA and/or analog cellular telephony transceiver capable of supporting voice, multimedia and/or data transfers over a cellular network. Alternatively, or in addition, the communication interface 208 may comprise a Wi-Fi, BLUETOOTH™, WiMax, infrared, NFC or other wireless communications link. The communication interface 208 may be associated with one or more shared or a dedicated antennas. The type of medium used by the portable electronic device 112 to communicate with other portable electronic devices may depend upon the communication applications availability on the portable electronic device 112 and/or the availability of the communication medium.

The portable electronic device 112 may also include a location detector 216 such as a satellite positioning system or geographical location system. For example, the location detector 216 may refer to the Global Positioning System ("GPS"). In accordance with embodiments of the present invention, the location detector 216 may further provide absolute location information to other components of the portable electronic device 112. In some embodiments, a geographical location of the portable electronic device 112 may be determined based on the portable electronic device's 112 location-based features, a location signal, and/or combinations thereof. The location-based features, and corresponding location detector 216, may utilize data from one or more satellite positioning systems (e.g., GPS), WiFi access points, wireless connection and/or cellular tower 124, and the like.

The location provided by the location detector 216 may be utilized to determine one or more laws and/or rules to which the portable electronic device 112 must comply. For example, based on location of the portable electronic device 112 as determined by the location detector 216, the portable electronic device 112 may utilize the communication interface 208 to download, update, or otherwise access one or compliance configurations outlining rules or guidelines to be followed when operating the portable electronic device. For instance, the laws of one jurisdiction, such as a state, city, and/or country, may limit the features, functions, and/or applications available to a driver 104 and/or passenger 136 when the portable electronic device 112 is moving at a rate greater than a predetermined threshold. Such operations, or features, functions, and/or applications, may be limited based on how distracting they are to a driver 104. If the user attempts to use the portable electronic device 112 in an illegal mode (e.g., voice, text, etc.) while moving such mode may be disabled or otherwise inhibited while in that location/jurisdiction. As one example, the law and/or rule may make two-handed operation of the portable electronic device 112 mandatory. Accordingly, the portable electronic device 112, upon obtaining a location from the location detector 216 and according to one or more compliance configurations, may be configured automatically to comply with such a law and/or rule based on the location; therefore, the portable electronic device 112 may be configured to require two-handed operation when the portable electronic device 112 is moving at a rate greater than a predetermined threshold as specified in the compliance configuration. As another example, the portable electronic device 112 may store one or more compliance configurations locally, for instance, in the memory 204. Accordingly, the portable electronic device 112, upon obtaining a location from the location detector 216, may access one or more compliance configurations and/or settings from local memory 204. Alternatively, or in addition, the compliance configuration, which may be applied to the portable electronic device 112, may depend on a location of the portable electronic device 112 being within a certain predetermined and/or dynamically changing area. For example, one or more compliance configurations for an area may depend on whether the area is under construction, whether the area is crowded, and/or a time of the year.

Additionally, the portable electronic device 112 may include a movement detector 224. The movement detector 224 may determine whether the portable electronic device 112 is moving, and if so, provide a rate, or speed, of which the portable electronic device 112 is moving to the operability controller 244. The movement detector 224 may comprise one or more accelerometers, gyroscopes, magnetometers, and combinations thereof to determine if the portable electronic device 112 is moving and if so, how fast. Alternately, or in addition, the portable electronic device 112 may utilize the location detector 216, communication interface 208, and/or an external source of movement information to determine whether the portable electronic device 112 is moving, and if so, how fast. As one example, the portable electronic device 112 may utilize one of several methods such as GPS, cell tower registration, triangulation or the like to determine if and at what rate the portable electronic device 112 is moving. Upon determining that the portable electronic device 112 is moving, the movement detector 224 may provide such an indication to the operability controller 244. Alternatively, or in addition, the movement detector 224 may provide an indication of a speed of which the portable electronic device 112 is moving, or not moving, to the operability controller 244.

The operability controller 244, upon receiving movement information, may determine whether a rate at which the portable electronic device 112 is moving, as indicated by the movement detector 224, is greater than a predetermined threshold. If the portable electronic device 112 is moving at a rate that is greater than a predetermined threshold, the operability controller 244 may cause the portable electronic device 112 to enter a two-handed operational mode such that any further operation of the portable electronic device 112 requires that two hands be utilized. Alternatively, or in addition, upon determining that the portable electronic device 112 is moving at a rate greater than a predetermined threshold, the operability controller 244 may cause one or more features, functions, and/or applications of the portable electronic device 112 to enter into a two-handed operational mode. For example, if the movement detector 224 determines that the portable electronic device 112 is moving and provides the rate of movement to the operability controller 244, the operability controller 244 may determine that the portable electronic device 112 is moving at a rate greater than a predetermined threshold and cause the portable electronic device 112, web browser and/or text messaging functionality be restricted to a two-handed operational mode. Alternatively, or in addition, the movement detector 224 may provide an indication to the operability controller 244 indicating that the portable electronic device 112 is no longer moving. Accordingly the operability controller 244 may cause the portable electronic device 112 to exit the two-handed mode of operation and enter into a mode of operation that does not require two hands for operation. Similarly, if the movement detector 224 provides an indication to the operability controller 244 that the portable electronic device 112 is no longer moving, the operability controller 244 may cause one or more features, functions, and/or applications to enter a mode of operation such that two-hands are no longer required to operate the feature, function, or application.

In some instances, such as when the portable electronic device 112 is in a two-handed operational mode, a particular operation of the portable electronic device 112 may be inhibited by the operability controller 244 in a variety of ways such that two hands are required for the particular operation. For example, suppose the movement detector 224 determines that the portable electronic device 112 is moving and sends such indication to the operability controller 244. The operability controller 244 may determine that, in accordance with a rate of movement, such as a speed, exceeding a predetermined threshold, such as a predetermined speed, one or more of a feature, function, and/or application shall require two-hands to operate. Accordingly, the operability controller 244 may inhibit the feature, function, and/or application from operating until the finger/hand detector 220 determines that two hands are being utilized to operate the portable electronic device 112. As another example, suppose the feature, function, and/or application to be inhibited is web browsing. To inhibit a web browsing function, the operability controller 244 may disable a communication interface 208, inhibit portable electronic device 112 communication utilizing a specific port, such as port 80, prevent the web browser application from launching or otherwise displaying via the user interface 236 on a user output device 232, disabling a user input 228, such as a physical keyboard, an application keyboard, a touchscreen 114, etc. That is, there are many ways to alter an operability of the portable electronic device, and/or inhibit the function, feature, and/or application of the portable electronic device 112.

Figure 3A:
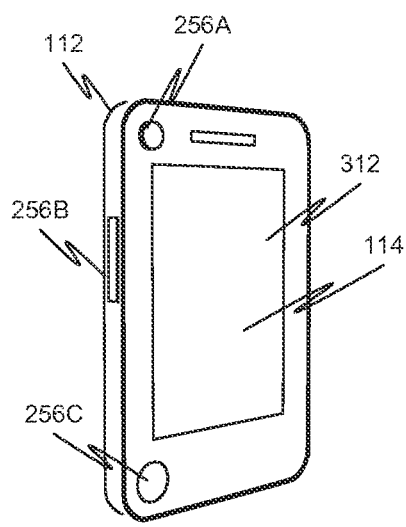
FIGS. 3A-3C illustrates one or more portable electronic devices in accordance with an embodiment of the present disclosure.
Figure 3B:
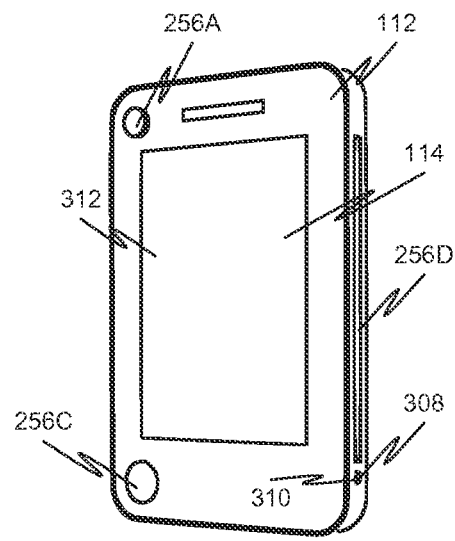
Figure 3C:
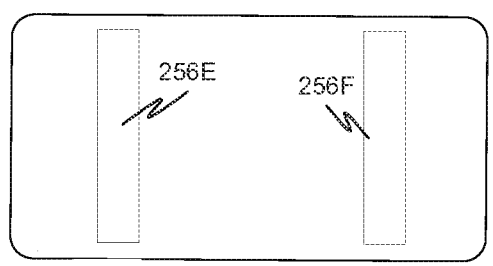

The portable electronic device 112 may further include one or more sensors 256. The one or more sensors 256 may detect the presence or absence of a body part, such as a hand, finger, or finger portion. For example, and as discussed with reference to FIGS. 3A-3B, one or more sensors 256A-F may reside on and around the portable electronic device 112; alternatively, or in addition, the portable electronic device may comprise one or more sensors 256. FIG. 3A illustrates at least one of a front surface and a side surface of the portable electronic device 112. FIG. 3B illustrates at least one of a front surface and a side surface of the portable electronic device 112. FIG. 3C illustrates a back surface of the portable electronic device 112. The one or more sensors 256A-F may be positioned such that a user may comfortably place their hand, finger, or finger portion on the sensor 256 when utilizing the portable electronic device 112. As one example, sensor 256C may be contacted by a user's thumb when utilizing the portable electronic device 112. Alternatively, or in addition, when a user naturally holds the portable electronic device 112, the use may be contacting sensors 256B and 256D. In addition, one or more sensors may be placed in locations that require a user of the portable electronic device 112 to deliberately make contact with the sensor. For example, sensor 256A may be located at the top of the portable electronic device 112 such that a user has to deliberately contact the sensor for the sensor to detect the user's hand, finger, and/or finger portion. As one non-limiting example, the sensors 256A-F may be capacitive touch sensors such that a change in capacitance when a user's hand, finger, and/or finger-portion contacts the sensor 256 may be detected; an indication that a user's finger, finger portion, and/or hand is present may then be based on this indication. Alternatively, or in addition, the sensor 256 may be operable to detect a fingerprint from a user's finger.

As previously discussed, the portable electronic device 112 may be equipped with a finger/hand detector 220 that detects the presence of one or more of a finger portion, a fingerprint portion, and/or a hand portion. Although explained with reference to a finger and a hand, the finger/hand detector 220 is not limited to detecting only a finger and a hand. For example, in some instances, the finger/hand detector 220 may detect the presence of an arm or other body part of a user, such as a driver 104 and/or passenger 136.

As the portable electronic device 112 may be in an operability mode that requires two-handed operation, the finger/hand detector 220 may be responsible for detecting whether a driver 104 and/or a passenger 136 are operating the portable electronic device 112 with two-hands. Accordingly, if the finger/hand detector 220 determines that the driver 104 and/or passenger 136 are operating the portable electronic device 112 with two hands, the finger/hand detector 220 may communicate such an indication to the operability controller 244 such that the operability controller 244 enables the operability of the portable electronic device 112, and/or a feature, function, and/or application of the portable electronic device that was previously inhibited. For example, if the portable electronic device is moving at a rate of speed greater than a threshold and if at least one fingerprint portion from of a left hand 116 and at least one fingerprint portion from a right hand 120 is detected, the finger/hand detector 220 may provide an indication to the operability controller 244 that the user of the portable electronic device 112 is utilizing two hands to operate the device. The operability controller 244 may then enable the operability of the portable electronic device 112 and/or a feature, function and/or application of the portable electronic device 112, so long as the finger/hand detector 220 continues to detect that the user is operating the device with two hands. For instance, the finger/hand detector 220 may require that a portion of each left hand 116 and a portion of each right hand 120 be detected within a certain period of time prior to providing an indication to the operability controller 244 indicating that two hands are or are not being utilized.

Figure 4:
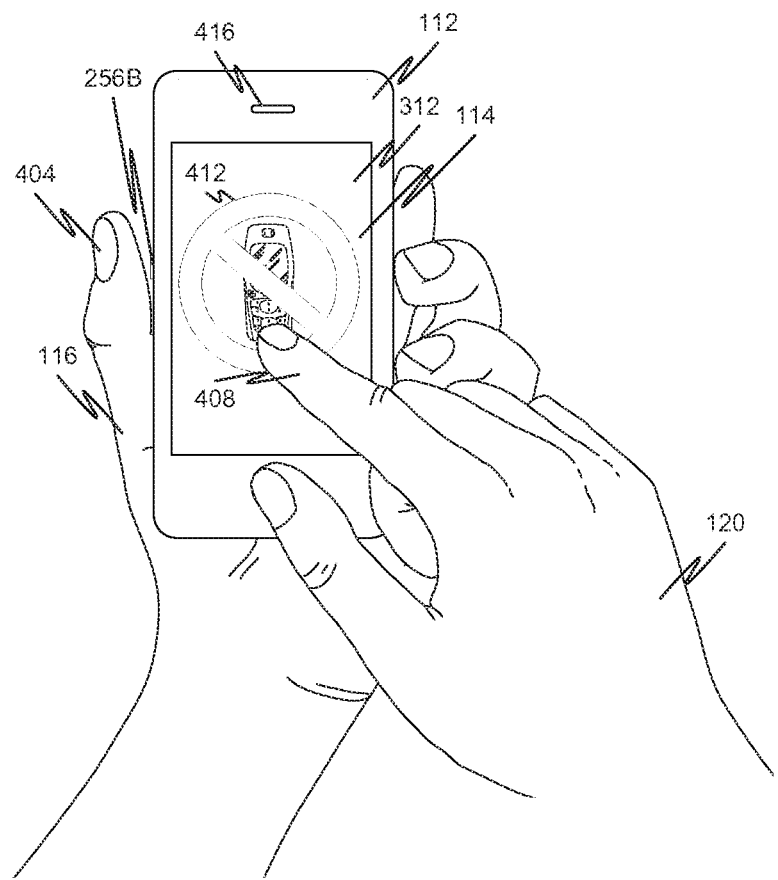
FIG. 4 illustrates another portable electronic device in accordance with an embodiment of the present disclosure.

The finger/hand detector 220 may utilize an indication provided by a sensor 256 to indicate the presence of the finger, finger portion, and/or hand. Alternatively, or in addition, the finger/hand detector 220 may rely on a touchscreen of a display 114 of the portable electronic device 112 to indicate the presence of a hand, finger, and/or fingerprint portion. As one example, and with reference to FIG. 4, a left hand 116 may be cradling or otherwise holding the portable electronic device 112. A right hand 120 may be attempting to touch the touchscreen 312 of display 114 or otherwise provide input via touchscreen 312. Since the left hand 116 may not be in contact with the sensor 256B, that is thumb 404 is not in contact with sensor 256B, the finger/hand detector 220 does not detect the left hand 116 and thus may provide an indication indicating that two hands are not being utilized. Moreover, the portable electronic device 112 may provide a notification to the user, such as a visual notification 412 indicating that the operation of the portable electronic device 112 is restricted in some manner. Alternatively, or in addition, the notification may be audible in nature, and may come from one or more audible speakers of the portable electronic device 112, such as speaker 416.

Figure 5:
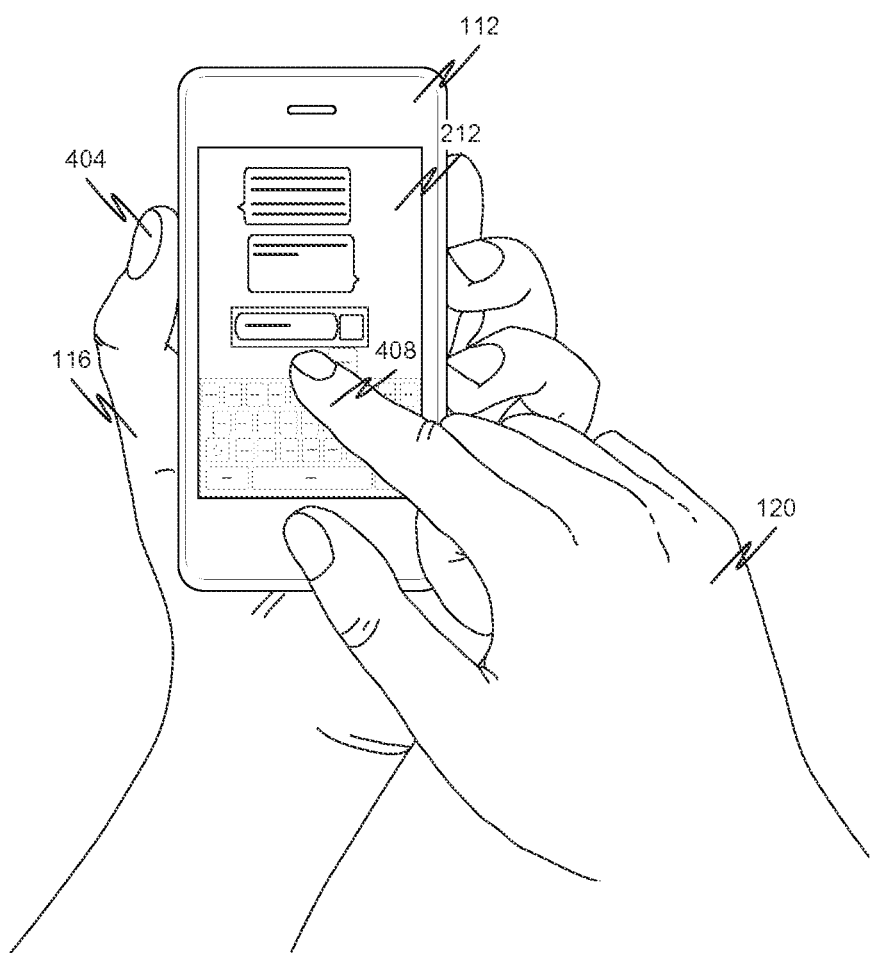
FIG. 5 illustrates another portable electronic device in accordance with an embodiment of the present disclosure.

With reference to FIG. 5, the left hand 116 may be in contact with sensor 256B (under thumb 404) and an index finger 408 of the right hand 120 may be in contact with the touch screen 312. Accordingly, the finger/hand detector 220 may detect and further determine that a user is utilizing the portable electronic device 112 with two hands.

Figure 6:
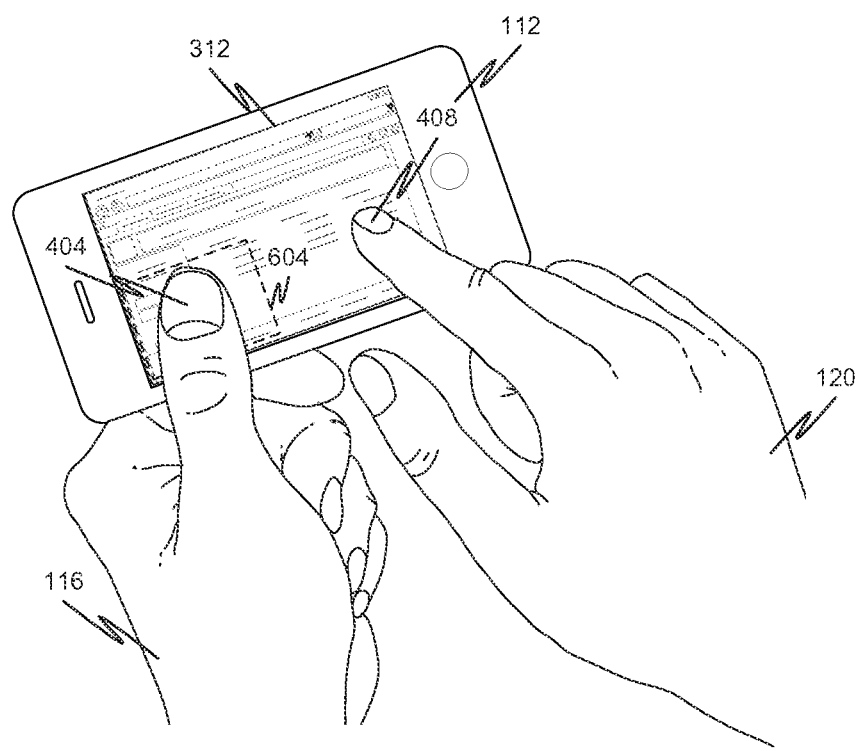
FIG. 6 illustrates another portable electronic device in accordance with an embodiment of the present disclosure.

Alternatively, or in addition, the finger/hand detector 220 may detect two finger portions and/or two fingerprint portions of a user. For example, and referring to FIG. 6, a left hand 116 of a user and a right hand 120 of a user may be used to operate the portable electronic device 112. The user may place a portion of a finger, such as a thumb 404 in contact with the touchscreen 312 of display 114 belonging to portable electronic device 112. Accordingly, the touchscreen 312 may provide an indication to the finger/hand detector 220 that a finger portion is within a predetermined area 604. Additionally, the touchscreen 312 may provide an indication to the finger/hand detector 220 that another contact with the touchscreen 312 is also detected—for example, finger 408 of the right hand 120 may be contacting the touchscreen 312. Accordingly, the finger/hand detector 220 may determine that a user is utilizing two hands to operate the portable electronic device 112 and provide such a determination to the operability controller 244.

As previously discussed, the area 604 may be in a predetermined area. However, the area 604 does not necessarily have to be a predetermined area. For example, and in some embodiments, a touchscreen 312 may detect a topology of fingers contacting the touchscreen anywhere to confirm two-handed texting. For example, each finger may have a known aspect ratio compared with other fingers. As a result the touchscreen 312 may determine that a finger portion 404 corresponds to a left hand thumb and that a finger portion 408 corresponds to a right hand index finger. Alternatively, or in addition, the aspect ratio of each finger may be used to detect fingers from one hand wrapping around the edge of the device while a second hand is used to actuate the text keystrokes. Accordingly, the finger/hand detector 220 may determine that a user is utilizing two hands to operate the portable electronic device 112.

Moreover, the actual fingerprints themselves may be utilized to differentiate between fingers of a user's hands. For example, a user may enroll each fingerprint into a user profile specific to a user, such as a profile presented in FIG. 8. Accordingly, based on a user operating the portable electronic device 112, the portable electronic device 112 may determine that a thumbprint from thumb 404 corresponds to a user's left hand thumb and that an index fingerprint from index finger 408 corresponds to a user's right hand index finger. Accordingly, the finger/hand detector 220 may determine that a user is utilizing the portable electronic device 112 using two hands.

Alternatively, or in addition, the finger/hand detector 220 may utilize keystroke cadence to deal with the issue of a driver trying to do two-handed texting while driving and breaking their cadence when looking up for vehicle control purposes. For example, even though a user may be utilizing two hands, if there are long pauses between inputs, for example, contacting the touchscreen 312 and/or selecting a letter or word while text messaging, the portable electronic device 112 may determine that the cadence is similar to a cadence of a user who is not fully concentrating on operating a portable electronic device. Similarly, since a distracted user may enter a small cluster of characters, pause, and enter another small cluster of characters, the rate at which the characters are entered, the "burstyness" of the characters entered, and the duration of the pauses in between may be compared to one or more patterns indicative of a user who is not fully concentrated on operating a portable electronic device. Accordingly, the operability controller 244 may inhibit one of a device operability, function, feature, and/or application of the portable electronic device 112 until a reset occurs, the user performs a series of tasks or steps which sufficiently indicate that the user is a passenger and not the driver, the cadence speed improves, and/or one or both hands 116 and 120 are adjusted and detected.

Figure 7:
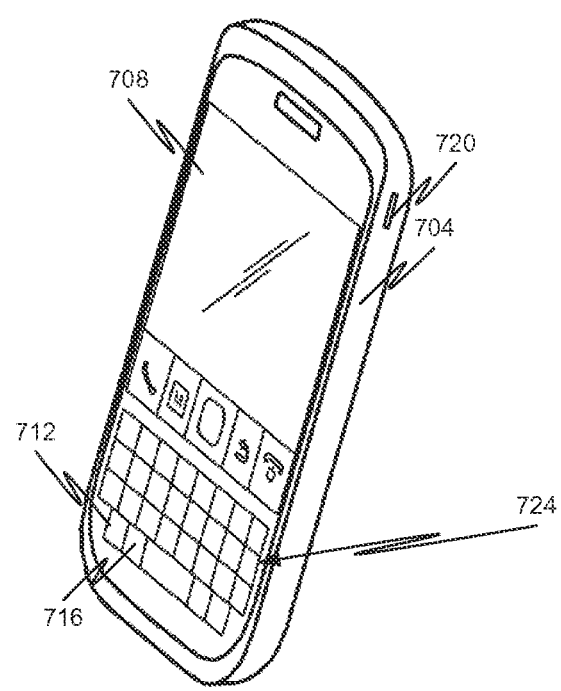
FIG. 7 illustrates another portable electronic device in accordance with an embodiment of the present disclosure.

Referring now to FIG. 7, the finger/hand detector 220 may utilize one or more of a hard key and a key combination while text or other input is being entered into a portable electronic device as an indication that two hands are being utilized to operate the portable electronic device 112. For example, the portable electronic device 704 may be a communication device lacking a touchscreen feature; that is, the portable electronic device 704 may have a non-touch display 708. Portable electronic device 704 may be the same or similar to that of portable electronic device 112. Accordingly, the finger/hand detector 220 of the portable electronic device 704 may detect that a user is utilizing a so-called "hard key" on the portable electronic device 704. Accordingly, if a user were to hold down a "hard key", such as hard key 720, while utilizing one or more keys of the keypad 724, the finger/hand detector 220 may determine that a user is utilizing two hands to operate the portable electronic device 704. As one example, the hard key 720 may have one meaning when touched a single time and another when touched twice. Accordingly, this could require holding this hard key 720 down as a method of utilizing one hand and the entry of characters to indicate usage by a second hand.

Moreover, two or more keys located near the periphery of the device may be held down while gripping the device in one hand and while keystrokes are entered on a keypad 724 with a second hand. Depending on the keys available for such a purpose, for example keys 712 and keys 716, the finger/hand detector 220 may determine that if keys 712 or 716, individually or in combination are pressed down, that at least one hand of a user is being utilized to operate the portable electronic device 704. Additionally, if other keys from a keypad 724 are pressed down at the same time keys 712 and/or 716, the finger/hand detector 220 may determine that a user is utilizing two hands with the portable electronic device.

Referring again to FIG. 2, the portable electronic device 112 may further include a protective shell detector 252 which may detect the presence of a protective shell or case. For example, a protective shell or case may surround or otherwise cover the portable electronic device 112 such that the portable electronic device 112 may be protected from exposure to environmental hazards, such as rain, snow, or scratching. The portable electronic device 112 may be outfitted with the protective shell to add one or more functionalities or sensors as will be described with respect to FIGS. 13A and 13B. That is, the protective shell may be in communication with the portable electronic device 112. As will be discussed later, the protective shell detector 252 may operate to render the portable electronic device 112 disabled should the protective shell be removed.

The protective shell detector 252 may utilize an inductive field to determine whether the protective shell is present. As one example, the protective shell may product a short-range inductive field such that that portable electronic device 112 is able to detect the presence of this field when the protective shell is near. Alternatively, or in addition, the protective shell detector 252 may produce a short-range inductive field and the protective shell may report back to the protective shell detector 252 whether the short-range inductive field is detected.

Communications between various components of the portable electronic device 112 may be carried by one or more buses 260. Moreover, power can be supplied to the components of the portable electronic device 112 from a power source 248. The power source 248 may, for example, include a battery, an AC to DC converter, power control logic, and/or ports for interconnecting the portable electronic device 112 to an external source of power.

Although the portable electronic device 112, 704 has been described as including a movement detector 224 and an operability controller 244, the movement detector 224 and the operability detector 244 may optionally reside at a service provider 152. The service provider 152 may provide service, such as cellular service and/or data service, for example, to the portable electronic device 112,704. Further, the movement detector 224 and/or the operability controller 244 may be distributed amongst the portable electronic device 112, 704 and/or the service provider 152 such that portions of the movement detector 224 and/or the operability controller 244 reside at the portable electronic device 112, 704 and/or the service provider 152. Accordingly, a movement detector 224 located at the service provider 152 may determine that the portable electronic device 112, 704 is moving at a rate of speed greater than a predetermined threshold. As one example, the movement detector 224 located at the service provider 152 may determine that the portable electronic device 112, 704 has utilized one or more wireless connections and/or cellular towers 124 within a predetermined period of time indicating a general movement from one location to another location within a period of time. As another example, the movement detector 224 located at the service provider 152 may determine and track the location of the portable electronic device 112, 704 by triangulation. Alternatively, or in addition, the portable electronic device 112, 704 may communicate a rate of speed to the service provider 152. Moreover, an operability controller 244 may modify an operability of a service provided to the portable electronic device 112, 704 based on the rate of speed. For example, the operability controller 244 located at the service provider 152 may require the portable electronic device 112, 704 enter a two-hand operation mode. Alternatively, or in addition, the operability controller 244 located at the service provider 152 may disable a cellular and/or data service, prevent incoming and/or outgoing text messages, and/or redirect all web communications to a specified website unless the finger/hand detector 220 determines that two hands are being used to operate the device.

Referring now to FIG. 8, one or more profiles may be utilized to customize the two-hand operation according to embodiments of the present location. For example, profiles 800 may be stored in the user profile store 240 and may include one or more settings and/or configurations regarding how or when a two-handed mode operation may be required.

For example, as non-limiting examples of configurable items, a user profile 804, for example, for User 1, may indicate that Two-Hand Operation is always required when moving, as illustrated by parameter 812. Accordingly, when User 1 is using a portable electronic device 112, 704, and the portable electronic device is moving, two-hand operation may be required. That is, the operability controller 244 may inhibit all device functions when the portable electronic device 112, 704 is moving.

As another example, a profile 808 associated with User 2 may be more configurable. For example, User 2 may be able to configure configurable portions 816A-816J to control the implementation of the two-handed operations at a more granular level. For example, User 2's profile may provide the following customizations: 816A—if, based on the user's profile, the portable electronic device 112, 704 is subject to local laws based on a current location; 816B—at what speed the two-handed operation is required for portable electronic device 112, 704; 816C—based on the user's profile, if the portable electronic device 112, 704 is subject to cadence detection; and 816D—which functions, features, and/or applications are affected when the two-hand mode is enabled. For example, in instances where the operability of the portable electronic device 112, 704 is not subject to the two hand operational mode, a user profile may indicate which, if any, individual features, functions, and/or applications are affected by the two-hand mode operation. For example, a configuration may include the following: keyboard configuration 824E, Text Messaging configuration 816F, Web Browsing 816G, E-Mail 816H, Angry Birds® 816I, and data communication 816J.

Alternatively, or in addition, the user profile may have an exceptions section indicating when and what functions, features, and/or applications are not subject to two-hand mode operation. For example, a user profile 812 for User 3 may have a parameter setting override 820 which may indicate that when a voice to text application is used, the portable electronic device 112, 704 may not be subject to two-hand mode operations. Additionally, if a Bluetooth® headset or hands free device is being utilized, the portable electronic device 112, 704 may not be subject to a two-hand mode operation. As another example, if certain one of inputs 228 are utilized, the operability of the portable electronic device and/or a feature, function, and/or application may not be inhibited. Alternatively, or in addition, a communication, such as an emergency communication like a phone call to 9-1-1 in the United States of America or a Text-to-911 text message, may not be subjected to two-hand mode operation. That is, the portable electronic device 112, 704 may not inhibit an emergency communication. The determination not to inhibit a communication, or apply an exception, may be based on one or more of a profile, a recipient of the communication, and/or a public safety requirement. Additional exceptions are also contemplated herein.

Figure 9:
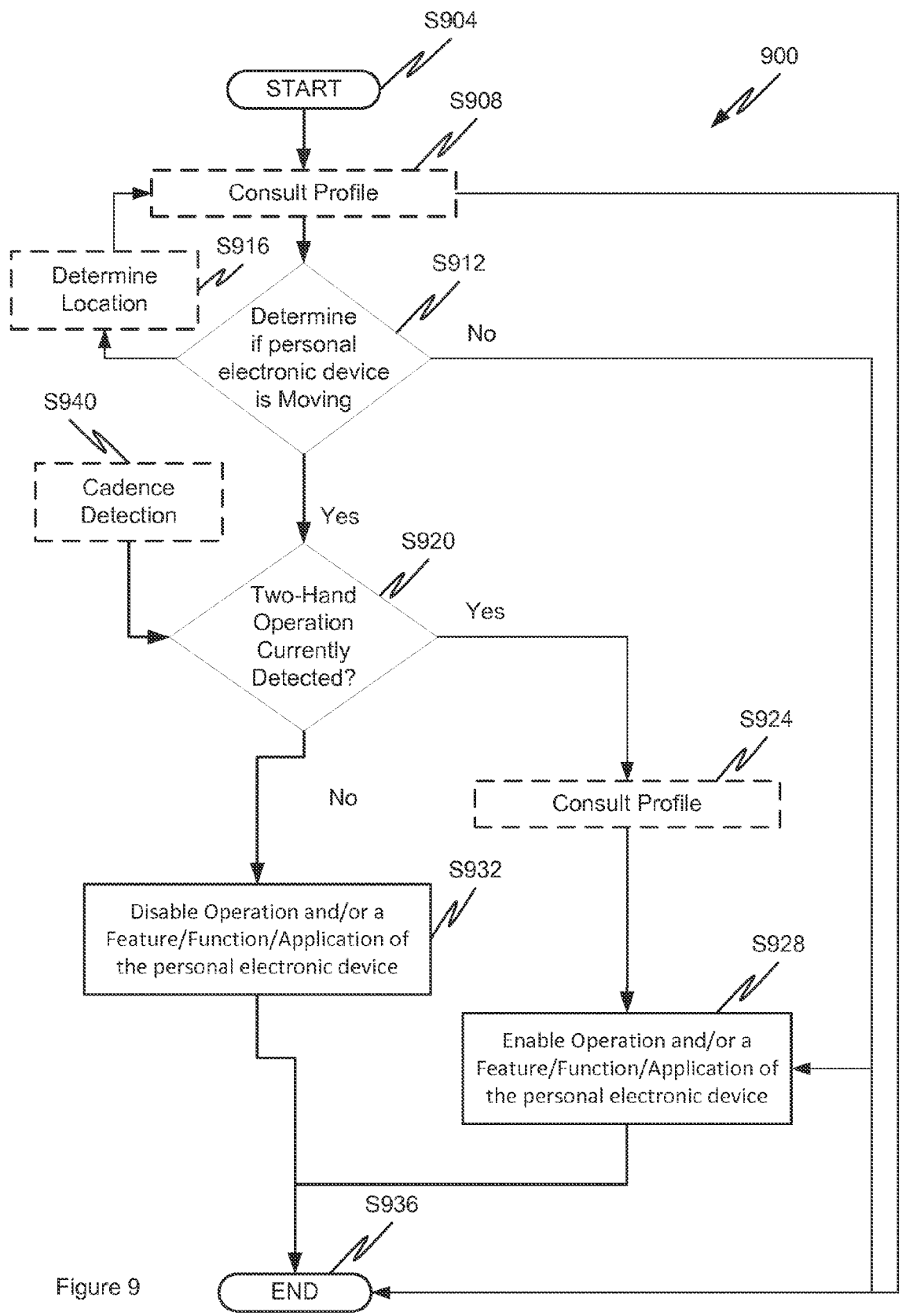
FIG. 9 is a flow diagram depicting a method associated with a portable electronic device in accordance with an exemplary embodiment of the present disclosure.

Referring now to FIG. 9, a method 900 of requiring two-handed operation of a portable electronic device will be discussed in accordance with embodiments of the present disclosure. Method 900 is in embodiments, performed by a device, such as a portable electronic device 112. More specifically, one or more hardware and software components may be involved in performing method 900. In one embodiment, one or more of the previously described modules and/or devices perform one or more of the steps of method 900. The method 900 may be executed as a set of computer-executable instructions executed by a portable electronic device 112 encoded or stored on a computer-readable medium. Hereinafter, the method 900 shall be explained with reference to systems, components, modules, software, etc. described with FIGS. 1-8.

Method 900 may continuously flow in a loop, flow according to a timed event, or flow according to a change in an operating or status parameter. Method 900 is initiated at step S904 where a user, such as a driver 104 and/or a passenger 136 activates or otherwise interacts with portable electronic device 112. At optional step S908, a profile, such as the user profile 800 from a user profile store 240 is consulted. If for example, the user profile 800 is configured such that a user associated with the profile is not subject to two-handed operational modes, the method 900 may proceed to step S936. Otherwise, the method 900 may proceed to step S912 where it is determined if the portable electronic device is moving as previously discussed with reference to the movement detector 224. The movement detector at step S912 may also determine whether the portable electronic device 112 is moving at a rate that is greater than a predetermined threshold, for example, a speed parameter 816B specified in a user profile 800. If it is determined that the portable electronic device 112 is moving, the method 900 may proceed to optional step S916 where a location of the portable electronic device 112 is determined as previously discussed with reference to the location detector 216.

Based on the location determined at step S916, the method 900 may consult a profile at step S908, where a profile consulted at step S908 may contain a compliance configuration as previously discussed with respect to the location detector 216 and a user profile store 240. If, at step S912, method 900 determines that the portable electronic device 112 is moving at a rate that is greater than a predetermined threshold, the method 900 may then proceed to step S920 where method 900 determines whether a two-hand operation is currently detected (i.e. whether a user is currently using two hands to operate the portable electronic device 112). The method 900 may determine whether two hands are currently being utilized as previously discussed with reference to the finger/hand detector 220. If at step S920, the finger/hand detector 220 determines that two hands are not currently being used to operate the portable electronic device 112, method 900 may proceed to step S932 where an operability, such as an operation, of the portable electronic device 112 is inhibited. Alternatively, or in addition, at step S932, one of such feature, function, and/or application of the portable electronic device 112 may be inhibited as previously discussed with respect to the operability controller 244. The method 900 then moves to step S936 where the method 900 ends.

If at step S920, method 900 determines that a two-handed operation is currently being utilized by the portable electronic device 112, method 900 may proceed to optional step S924 where a profile may once again be consulted. For example, and as previously discussed, the profile may be consulted to determine which, if any, of the functions, features, and/or applications should be enabled. Alternatively, or in addition, the profile consulted at step S924 may indicate that the portable electronic device 112 as a whole should no longer be inhibited. The method 900 may then proceed to step S928 where the operation of the portable electronic device and/or a feature, function, application is enabled or no longer inhibited, as previously discussed with respect to the operability controller 244. Method 900 then proceeds to step S936 where method 900 ends.

If at step S912, it is determined that the portable electronic device 112 is not moving and/or the portable electronic device 112 is not moving greater than a predetermined threshold, method 900 may proceed to step S924 and or step S928 to determine which, if any operations, features, functions, and/or applications should be enabled.

Step S920 may also consider whether an optional detected cadence at step S940 indicates that a driver or a passenger is utilizing the portable electronic device. As will be described with respect to FIG. 11, if a cadence is detected that is indicative of a driver utilizing the portable electronic device, method 900 may proceed to step S932. Otherwise, method 900 may proceed to step S924/S928.

Figure 10:
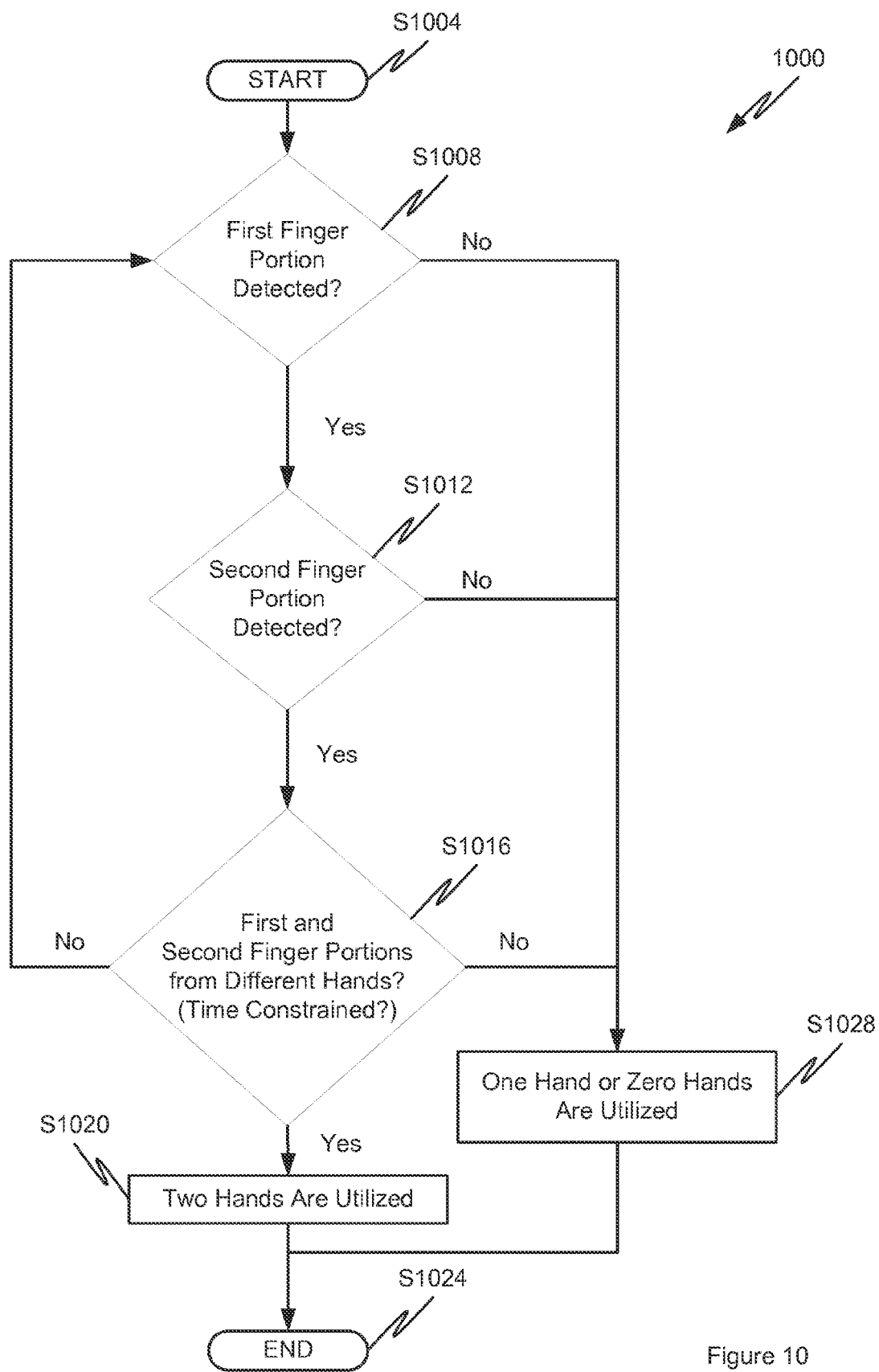
FIG. 10 is a second flow diagram depicting a method associated with a portable electronic device in accordance with an exemplary embodiment of the present disclosure.

Referring now to FIG. 10, additional details of step S920 presented in FIG. 9 will be discussed as method 1000. Method 1000 is in embodiments, performed by a device, such as a portable electronic device 112. More specifically, one or more hardware and software components may be involved in performing method 1000. In one embodiment, one or more of the previously described modules and/or devices perform one or more of the steps of method 1000. The method 1000 may be executed as a set of computer-executable instructions executed by a portable electronic device 112 encoded or stored on a computer-readable medium. Hereinafter, the method 1000 shall be explained with reference to systems, components, modules, software, etc. described with FIGS. 1-9.

Method 1000 may continuously flow in a loop, flow according to a timed event, or flow according to a change in an operating or status parameter. Method 1000 is initiated at step S1004 after it is determined that the portable electronic device 112 is moving and/or that the portable electronic device 112 is moving at a rate greater than a predefined threshold. Method 1000 may proceed to step S1008 where a first finger portion may be detected. The first finger portion may optionally correspond to a first fingerprint portion. If a first finger portion is detected at step S1008, method 1000 then proceeds to step S1012 where a second finger portion is detected. Similar to step S1008, the second finger portion may correspond to a second fingerprint portion. If a second finger portion is detected at step S1016, method 1000 then proceeds to step S1016 where method 1000 determines whether the first finger portion and the second finger portion are from different hands. If the method 1000 determines that the first finger portion and the second finger portion are from different hands, the method 1000 may then determine that two-hands are detected. Method 1000 then proceeds to step S1024 where method 1000 ends and/or method 900 proceeds to step S924. If at step S1008, S1012, and/or step S1016, method 1000 does not detect a first finger portion, a second finger portion, or the first finger portion and the second finger portion are from the same hand, method 1000 proceeds to step S1028 where method 1000 may determine that one hand or zero hands are being used. Additionally, method 1000 may determine whether the first and second finger portions were detected within a time-constrained period. For example, if the first and second finger portions match and were detected within a short amount of time, the method 1000 may proceed to step S1020. Otherwise, if too much time has passed between the detection of the first finger portion and the detection of the second finger portion, then method 1000 may proceed to step S1008. The amount of time that passes between the detection of the first finger portion and the second finger portion may be configurable and may be an adjustable parameter in a profile 800.

Figure 11:
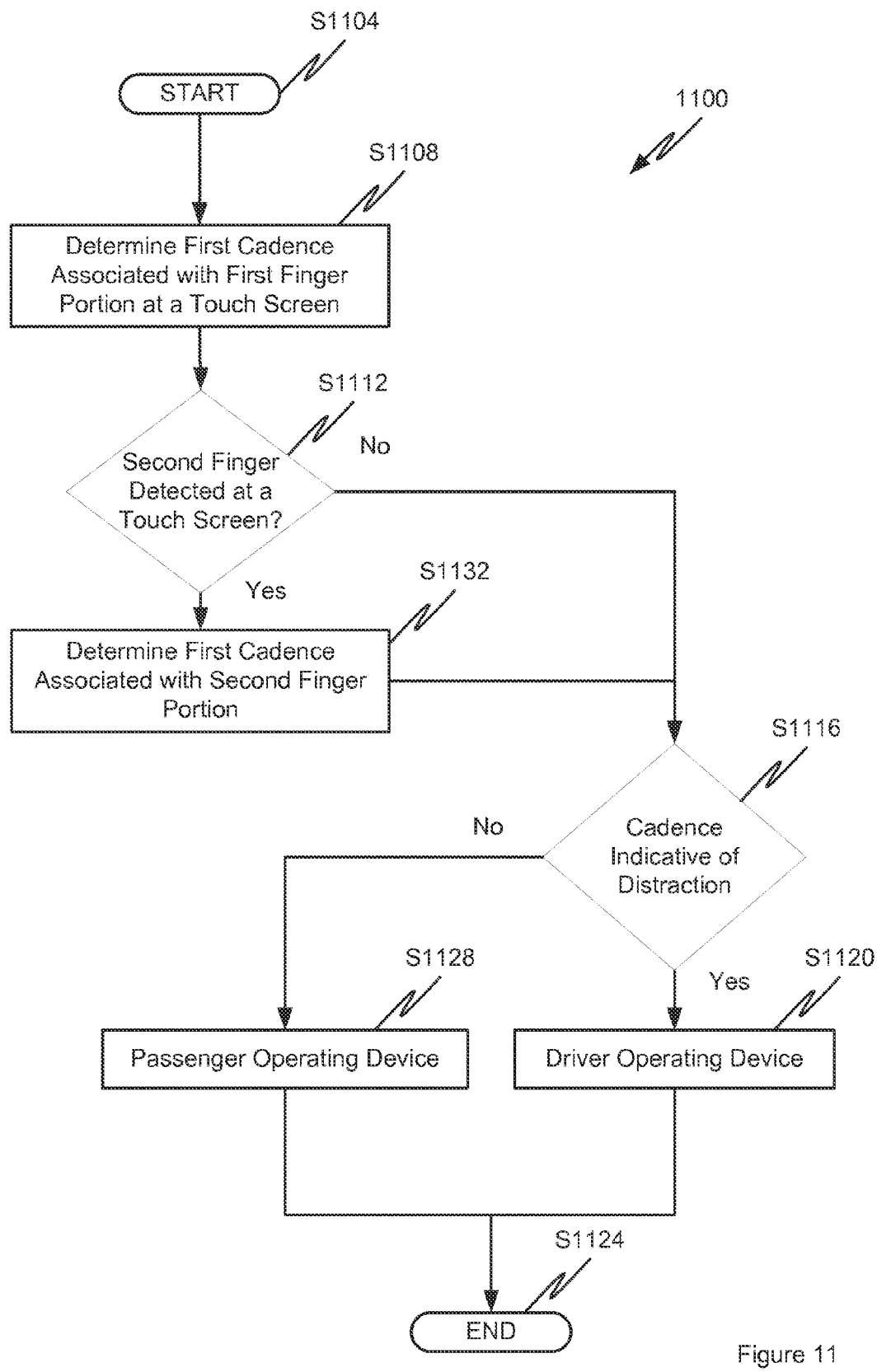
FIG. 11 is a third flow diagram depicting a method associated with a portable electronic device in accordance with an exemplary embodiment of the present disclosure.

Referring now to FIG. 11, a method 1100 of utilizing a detected cadence according to step S940 in FIG. 9 will be described in accordance with at least one embodiment of the present disclosure. Method 1100 is in embodiments, performed by a device, such as a portable electronic device 112. More specifically, one or more hardware and software components may be involved in performing method 1100. In one embodiment, one or more of the previously described modules and/or devices perform one or more of the steps of method 1100. The method 1100 may be executed as a set of computer-executable instructions executed by a portable electronic device 112 encoded or stored on a computer-readable medium. Hereinafter, the method 1100 shall be explained with reference to systems, components, modules, software, etc. described with FIGS. 1-10.

Method 1100 may continuously flow in a loop, flow according to a timed event, or flow according to a change in an operating or status parameter. Method 1100 is initiated at step S1104 where a parameter, such as a parameter from a user profile 800, indicates that a cadence is to be detected and utilized to further determine if the cadence is indicative of a driver 104 or a passenger 136 using the portable electronic device. Method 1100 may proceed to step S1108 where a first cadence associated with a first finger portion is determined. For example, method 1100 may determine an average time between inputs corresponding to a first fingerprint portion and/or a first area in which an input on a touch screen is utilized. Method 1100 may then proceed to step S1112 where method 1100 determines whether a second finger is detected at a touch screen. As previously discussed, embodiments of the present disclosure may determine that two hands are being utilized to operate the portable electronic device 112. In some embodiments, the second hand may be detected by a sensor 256 or the second hand may be detected at the touch screen, such as in FIG. 6. Accordingly, at step S1112, it is determined whether or not the second finger, or hand, is detected at the touch screen. If, at step S1112, it is determined that the second finger is not detected at the touch screen, method 1100 may proceed to step S1116 where it is determined whether the determined first cadence is indicative of a user, such as a driver 104, operating the device while driving. If, at step S1116, the cadence is sporadic, bursty, and/or varies according to one or more distracted driving patterns, the method 1100 proceeds to step S1120 where method 1100 indicates that the cadence is indicative of a driver, such as driver 104, using the portable electronic device while driving. Method 1100 then proceeds to step S1124 where the method 1100 ends and/or proceeds to step S920 in FIG. 9.

If, at step S1112, a second finger is detected at a touch screen, such as touch screen 312, method 1100 may proceed to step S1132 where method 1100 determines a first cadence associated with a second finger portion. Method 1100 then proceeds to step S1116 where the first cadence and the second cadence may be considered. For example, if both the first and second cadences are sporadic, bursty, and/or vary according to one or more distracted driving patterns, the method 1100 may proceed to step S1120. If, on the other hand, the first cadence, the second cadence, and/or a combination of the first cadence and the second cadence do not indicate that a driver, such as driver 104 is operating the portable electronic device, then method 1100 may proceed to S1128 where it may be assumed that the operation is being performed by a passenger. Method 1100 may then end at step S1124 or proceed to step S920 in FIG. 9.

Figure 12:
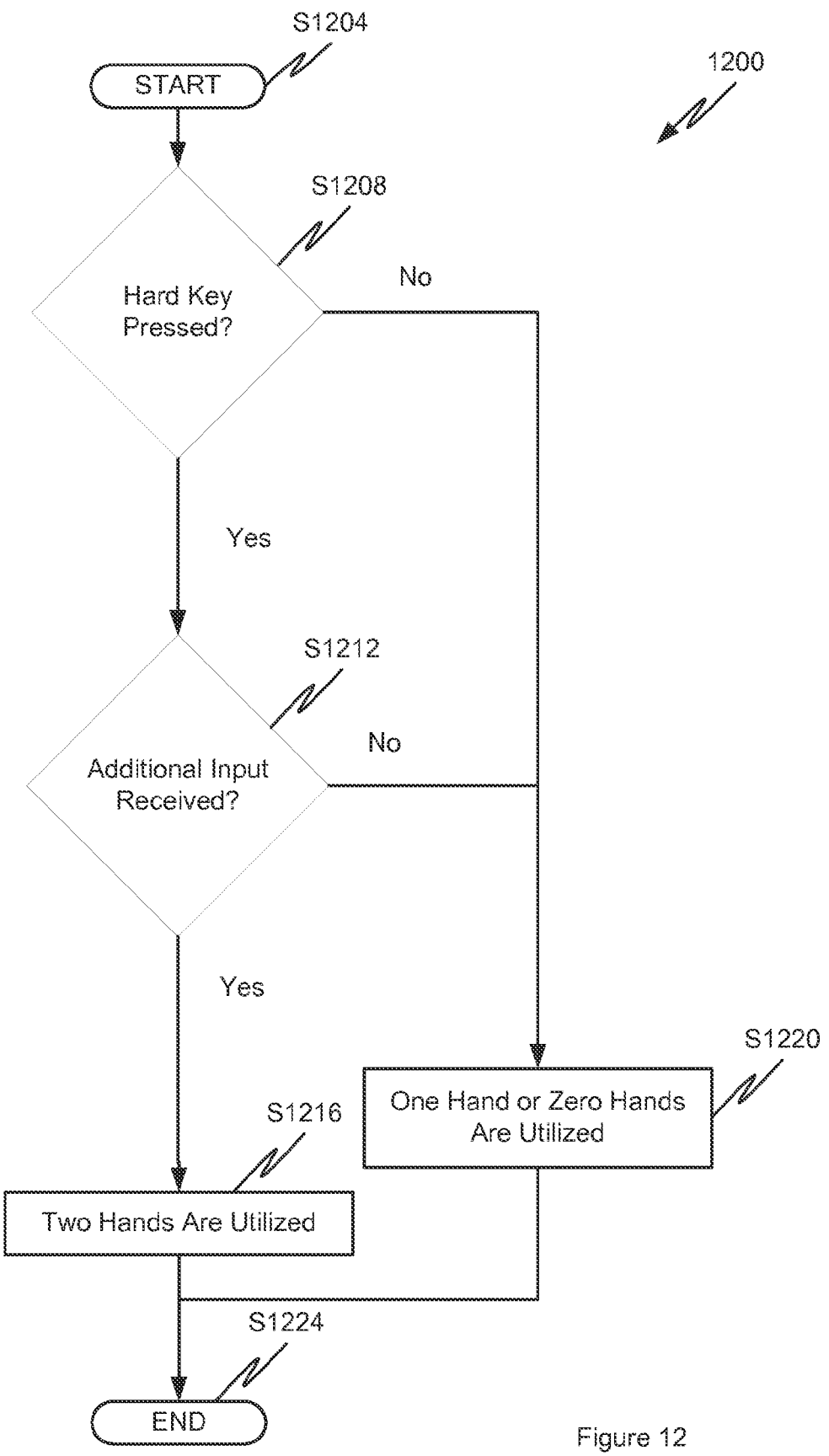
FIG. 12 is a fourth flow diagram depicting a method associated with a portable electronic device in accordance with an exemplary embodiment of the present disclosure.

Referring now to FIG. 12, additional details of step S920 presented in FIG. 9 will be discussed as method 1200. Method 1000 is in embodiments, performed by a device, such as a portable electronic device 112 where a hard key may be utilized. More specifically, one or more hardware and software components may be involved in performing method 1200. In one embodiment, one or more of the previously described modules and/or devices perform one or more of the steps of method 1200. The method 1200 may be executed as a set of computer-executable instructions executed by a portable electronic device 112 encoded or stored on a computer-readable medium. Hereinafter, the method 1200 shall be explained with reference to systems, components, modules, software, etc. described with FIGS. 1-11.

Method 1200 may continuously flow in a loop, flow according to a timed event, or flow according to a change in an operating or status parameter. Method 1200 is initiated at step S1204 after it is determined that the portable electronic device 112 is moving and/or that the portable electronic device 112 is moving at a rate greater than a predefined threshold. Method 1200 may proceed to step S1208 where method 1200 determines if a hard key is pressed. For example, in embodiments where a portable electronic device does not have a touch screen, such as portable electronic device 704, or where both finger portions are not detected at a touch screen, the method 1200 may be utilized. If, at step S1208, the hard key is pressed, the method 1200 may proceed to step S1212 where method 1200 determines if additional input is received at the portable electronic device. For example, the additional input may correspond to input from a keypad 724 and/or a touch screen 312. If additional input is received at step S1212 while the hard key is pressed, method 1200 may assume that two hands are being utilized at step S1216. If, on the other hand, a hard key is not pressed at step S1208 and/or additional input is not received at step S1212, the method 1200 may proceed to step S1220 where method 1200 may assume that one or zero hands are being utilized. Method 1200 may then end at step S1224 and/or proceed to step S924 and/or S932.

Figure 13A:
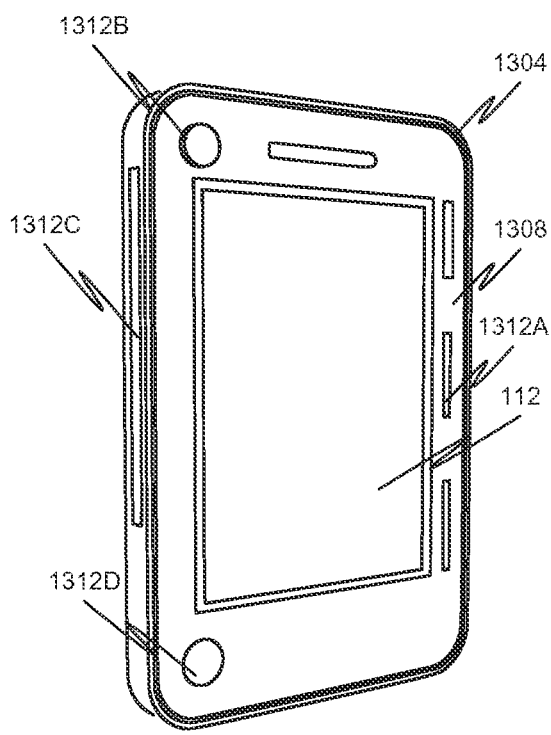
FIGS. 13A-13B illustrate a protective shell in accordance with an embodiment of the present disclosure.
Figure 13B:
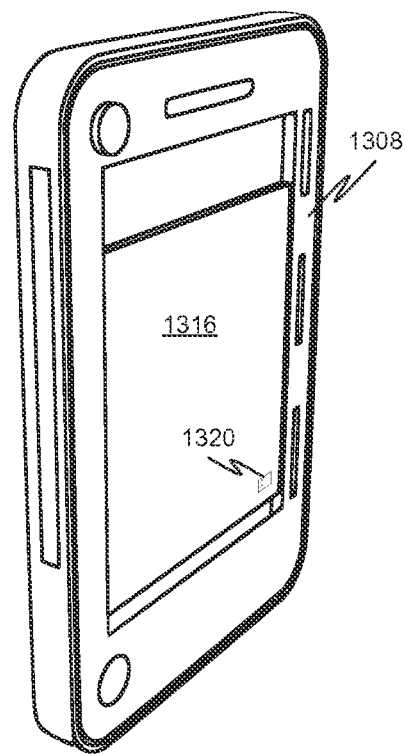

Referring now to FIGS. 13A and 13B, a protective shell, or case, 1304 may be utilized in accordance with some embodiments of the present disclosure. The protective shell may be made of any material which protects a portable electronic device, such as portable electronic device 112 from one or more hazardous environmental conditions, such as exposure to liquids, scratches and the like. The protective shell 1304 may be in communication with the portable electronic device 112 such that the portable electronic device 112 may detect the presence of a finger and or a hand at any one of the sensors 1312A-1312D. For example, sensors 1312 may be the same or similar as and operate in the same or similar manner as sensors 256. Moreover, the protective shell 1304 may provide additional functionality to a portable electronic device not having the ability or capability to detect and/or distinguish between two fingers on two different hands. That is, the protective shell 1304, in communication with a portable electronic device may operate according to one or more embodiments previously described herein. For example, the protective shell 1304 may have a protective portion 1308 that overlaps or otherwise covers a portion of the portable electronic device 112. The protective portion 1308 may include one or more sensors 1312 for detecting the presence of a finger and/or hand portion.

Referring now to FIG. 13B, a protective shell 1304 shown without a portable electronic device will be described. In some embodiments, to ensure that the protective shell remains attached and/or in communication with the portable electronic device, the protect shell may further incorporate a non-removable component such that removal of the protect shell 1304 would disable the device. Accordingly, the non-removable component may be a power source, such as a battery 1316 having a battery connector 1320. Thus, if the protective shell 1304 is removed from a portable electronic device, such as the portable electronic device 704, the portable electronic device will cease to function and/or operate, as the power source has been removed. Moreover, the portable electronic device may also incorporate a mechanism, such as a physical mechanism 310 like a spring-loaded trap door, such that the removal of the protective shell 1304 would make it impossible to connect an auxiliary power supply, such as a USB charger or another battery, while the protective shell 1304 is not installed. That is, the protective shell 1304 would actuate the spring-loaded trap door covering a charging port or power port 308 such that the charging port or power port 308 is accessible only when the protective shell 1304 is attached to the portable electronic device 112. The protective shell 1304 may further communicate with the portable electronic device 112 utilizing a wired means of communications, for example through a charging port or power port 308 (FIG. 3). Alternatively, or in addition, the protective shell 1304 may communicate with the portable electronic device 112 utilizing wireless communications. Moreover, as previously described the protective shell 1304 and/or the portable electronic device 112 may detect and/or produce a short-range inductive field such that the removal of the protective shell from the portable electronic device 112 will be detectable.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method comprising:
   determining whether a portable electronic device is moving at a rate greater than a predetermined threshold;
   in response to determining that the portable electronic device is moving at a rate greater than the predetermined threshold, disabling a first operation of the portable electronic device;
   receiving an indication of two-handed operation being used to operate the portable electronic device; and
   while the portable electronic device is moving at a rate greater than the predetermined threshold and in response to receiving the indication of two-handed operation being used to operate the portable electronic device, enabling the previously disabled first operation of the portable electronic device.

2. The method of claim 1, wherein receiving the indication of two-handed operation being used to operate the portable electronic device includes:
   determining whether a finger portion from each of two hands have contacted the portable electronic device within a predefined time period.

3. The method of claim 2, further comprising:
   identifying a user based on a fingerprint of the finger portion from at least one of the two hands; and
   based on the identification, determining at least one operation of the portable electronic device to enable.

4. The method of claim 2, further comprising:
   determining a cadence associated with a detected first fingerprint portion at a first location and a detected second fingerprint portion at a second location;
   determining whether the cadence is less than a predetermine cadence threshold;
   in response to determining that the cadence is greater than the predetermine cadence threshold, maintaining the first operation of the portable electronic device in an enabled state; and
   in response to determining that the cadence is less than the predetermined cadence threshold, disabling the first operation of the portable electronic device.

5. The method of claim 2, wherein the predetermined threshold is a speed.

6. The method of claim 1, wherein receiving the indication of two-handed operation being used to operate the portable electronic device includes:
   detecting a first contact between a first finger portion and the portable electronic device;
   detecting a second contact between a second finger portion and the portable electronic device;
   determining whether the first finger portion and the second finger portion are from different hands; and
   in response to determining that the first finger portion and the second finger portion are from different hands, at least one of (i) maintaining the first operation of the portable electronic device in an enabled state, and (ii) enabling the first operation of the portable electronic device.

7. The method of claim 6, wherein the first finger portion is detected at a contact sensor on the portable electronic device.

8. The method of claim 6, wherein an indication that at least one hard key on the deportable electronic device is pressed comprises the first finger portion being detected.

9. The method of claim 1, wherein the first operation of the portable electronic device is text messaging.

10. The method of claim 1, further comprising:
    determining that the portable electronic device is moving at a rate less than or equal to the predetermined threshold; and
    enabling the previously disabled first operation of the portable electronic device.

11. A non-transitory computer-readable storage medium comprising processor executable instructions operable to perform the method of claim 1.

12. The method of claim 1, further comprising:
    determining a second operation based on one or more of a profile, a recipient of a communication, and a public safety requirement; and
    regardless of whether the indication of two-handed operation being used to operate the portable electronic device is received, maintaining the second operation as enabled based on one or more of the profile, the recipient of the communication, and the public safety requirement.

13. A system for controlling at least one of a feature and a function of a portable electronic device while the portable electronic device is moving at a rate greater than a predetermined threshold, the system comprising:
    the portable electronic device;
    a movement analyzer configured to determine whether the portable electronic device is moving at a rate greater than the predetermined threshold;
    a hand portion detector configured to determine whether two-handed operation input is being used while the portable electronic device is being operated; and
    a controller configured to disable a first operation of the portable electronic device while the portable electronic device is moving at a rate greater than the predetermined threshold, and enable the previously disabled first operation of the portable electronic device if the hand portion detector determines that two-handed input is being used during the operation of the portable electronic device.

14. The system of claim 13, wherein the hand portion detector is configured to determine that two-handed operation is being used while the portable electronic device is being operated by determining whether a fingerprint portion from each of two hands have contacted the portable electronic device within a predefined time period.

15. The system of claim 14, further comprising:
    an identifier engine configured to identify a user based on the fingerprint portion from at least one of the two hands and further determine the at least operation of the portable electronic device to disable based on the identification of the user, wherein in the at least one operation includes the first operation.

16. The system of claim 14, further comprising:
    a cadence determination engine configured to determine a cadence associated with a detected first fingerprint portion at a first location and a detected second fingerprint portion at a second location, wherein in response to determining that the cadence is greater than a predetermine cadence threshold, the controller maintains the first operation of the portable electronic device in an enabled state; and wherein in response to determining that the cadence is less than the predetermined cadence threshold, the controller disables the first operation of the portable electronic device.

17. The system of claim 13, wherein the hand detector is further configured to detect a first contact between a first finger portion and the portable electronic device, detect a second contact between a second finger portion and the portable electronic device, and determine whether the first finger portion and the second finger portion are from different hands, wherein in response to determining that the first finger portion and the second finger portion are from different hands, the controller at least one of (i) maintains the first operation of the portable electronic device in an enabled state, and (ii) enables the first operation of the portable electronic device.

18. A system for controlling at least one of a feature and a function of a portable electronic device while the portable electronic device is moving at a rate greater than a predetermined threshold, the system comprising:

the portable electronic device;

a protective shell configured to receive the portable electronic device, wherein the protective shell is communicatively coupled to the portable electronic device;

a movement analyzer configured to determine whether the portable electronic device is moving at a rate greater than the predetermined threshold;

a hand detector configured to determine whether two-handed operation is being used while the portable electronic device is being operated by determining whether at least one hand portion from each of two hands is in contact with a sensor located on the protective shell; and a controller configured to disable a first operation of the portable electronic device while the portable electronic device is moving at a rate greater than the predetermined threshold, and enable the previously disabled first operation of the portable electronic device if the hand detector determines that two-handed operation is being used while the portable electronic device is being operated.

19. The system of claim 18, wherein the first operation of the portable electronic device is text messaging.

20. The system of claim 19, wherein the portable electronic device is further configured such that removing the protective shell disables one or more operations of the portable electronic device.

* * * * *

UNITED STATES PATENT AND TRADEMARK OFFICE
CERTIFICATE OF CORRECTION

PATENT NO. : 9,143,602 B2
APPLICATION NO. : 14/091143
DATED : September 22, 2015
INVENTOR(S) : Paul Roller Michaelis It is certified that error appears in the above-identified patent and that said Letters Patent is hereby corrected as shown below:

Column 24, line 10, Claim 8; please "deportable" and replace it with --portable-- therein.

Signed and Sealed this
Nineteenth Day of July, 2016

Michelle K. Lee
*Director of the United States Patent and Trademark Office*